United States Patent [19]

Suzuki et al.

[11] 4,236,729
[45] Dec. 2, 1980

[54] SEATBELT SYSTEM

[75] Inventors: Ichiro Suzuki, Nagoya; Masanao Motonami; Hisashi Ogawa, both of Toyota, all of Japan

[73] Assignee: Toyota Jidosha Kogyo Kabushiki Kaisha, Toyota, Japan

[21] Appl. No.: 37,160

[22] Filed: May 8, 1979

[30] Foreign Application Priority Data

Aug. 18, 1978 [JP] Japan ............................ 53-114161[U]

[51] Int. Cl.³ ............................................. B60R 21/10
[52] U.S. Cl. .................................... 280/804; 297/469
[58] Field of Search .................... 280/804, 803, 802; 180/270, 268; 297/482, 483, 484, 469; 74/30, 29; 16/93 D, 93 R, 95 D, 95 R, 96; 104/93, 89, 110, 106, 165; 226/76, 77, 78, 79, 80, 82

[56] References Cited

U.S. PATENT DOCUMENTS

| | | | |
|---|---|---|---|
| 3,842,929 | 10/1974 | Wada et al. | 280/804 |
| 3,905,614 | 9/1975 | Lindblad | 280/803 |
| 4,004,829 | 1/1977 | Kato et al. | 280/802 |

FOREIGN PATENT DOCUMENTS 2445688  4/1976  Fed. Rep. of Germany ........... 280/804

*Primary Examiner*—John A. Pekar
*Attorney, Agent, or Firm*—Koda and Androlia

[57] ABSTRACT

A seatbelt system including a passenger restraining belt, a plastic tape coupled to one end of the passenger restraining belt which has a plurality of openings formed along its length, a sprocket wheel which engages with the plurality of openings in the plastic tape for moving the plastic tape and a motor for rotating the sprocket wheel whereby when the belt is moved, it is automatically fastened or unfastened. In addition, the seatbelt system includes a receiving space provided between the vehicle's rocker panel and an inner lining for receiving the remainder of the plastic tape after engagement with the sprocket wheel whereby the plastic tape will not project into the interior of the vehicle.

12 Claims, 8 Drawing Figures

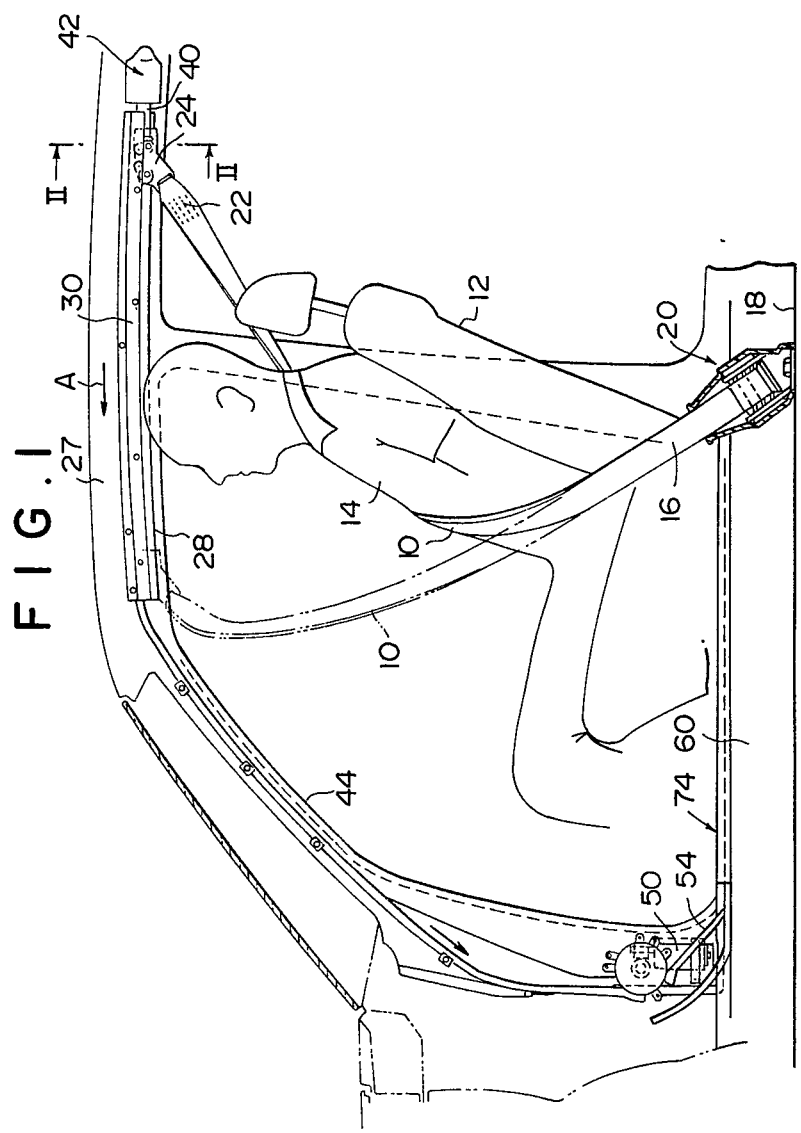

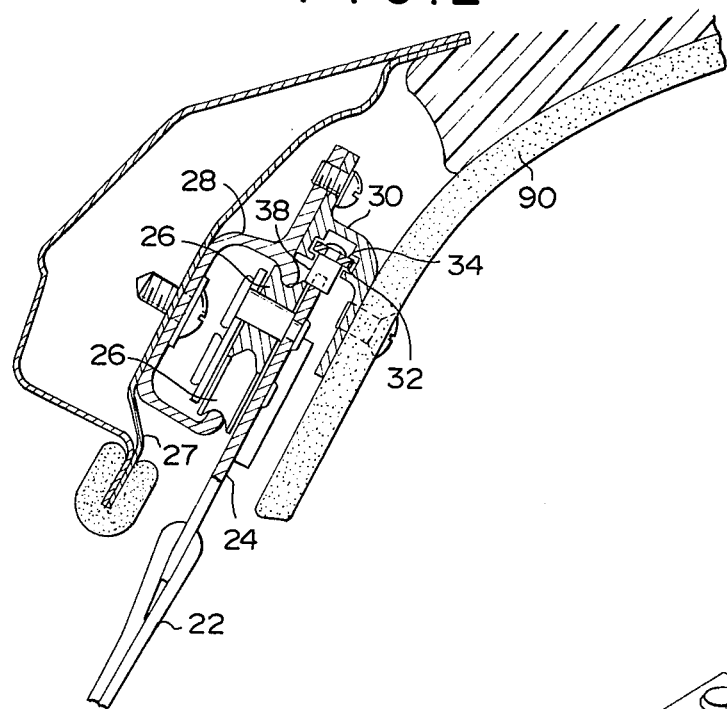
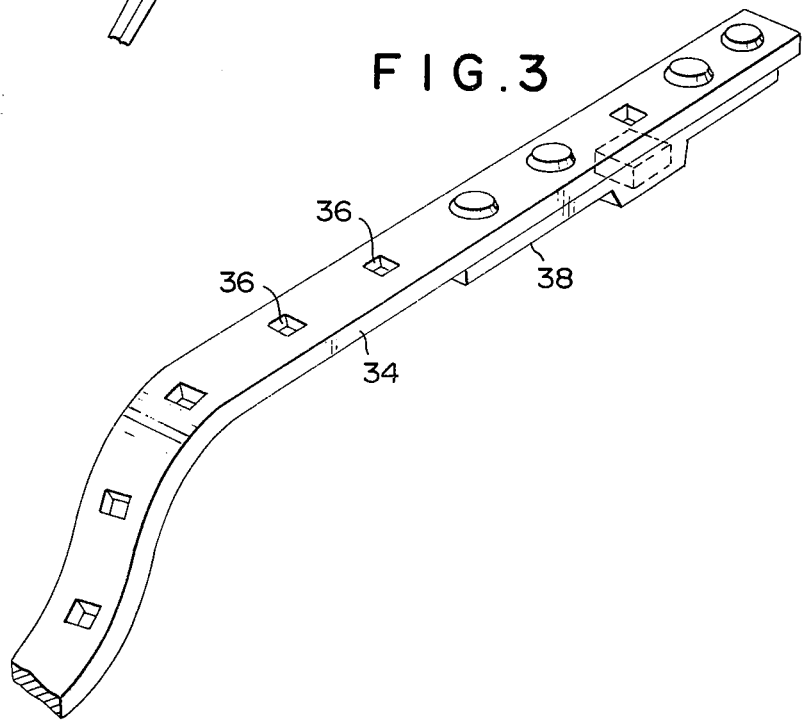

SEATBELT SYSTEM

BACKGROUND OF THE INVENTION

1. Field of the Invention

This invention relates to seatbelt systems and more particularly to seatbelt systems for automatically fastening a passenger restraining belt about a passenger.

2. Prior Art

Since seatbelt systems protect the passenger by restraining him in times of vehicular emergency, the safety of the passenger is good. However, because of the complexity, etc. of wearing belts, the proportion of seatbelt wearers is very low. For this reason, various types of systems which automatically fasten the belt about the passenger after he has seated himself are presently proposed.

Among these types of systems, those seatbelt systems which utilize a sprocket wheel turned by a motor and which drives a thick tape which engages with the sprocket wheel to automatically fasten the belt about the passenger are compact and are considered to be the most reliable. In these automatically fastened seatbelt systems, it is desirable that the sound level be controlled and the sprocket wheel and motor be provided in the lower portion of the front pillar or center pillar so that pleasant operation of the automatic fastening seatbelt system is possible.

SUMMARY OF THE INVENTION

Accordingly, it is a general object of the present invention to provide a seatbelt system wherein the thick tape extruded from the sprocket wheel is appropriately disposed so as to not be exposed to the interior of the vehicle.

It is also another object of the present invention to provide a seatbelt system whose assembly is easy and whose automatic fastening operation of the belt is not interfered with.

In accordance with the principles of the present invention, the objects are accomplished by a unique seatbelt system wherein the thick tape extruded by the sprocket wheel is extruded into a receiver space formed in the space between the top of the vehicle rocker panel and the interior lining.

BRIEF DESCRIPTION OF THE DRAWINGS

The above-mentioned features and objects of the present invetion will become more apparent with reference to the following description taken in conjunction with the accompanying drawings wherein like reference numerals denote like elements and in which:

FIG. 1 is a side view of the interior of the vehicle illustrating a first embodiment of the seatbelt device in accodance with the teachings of the present invention;

FIG. 2 is a cross sectional view along the line II—II in FIG. 1;

FIG. 3 is a partial close-up view illustrating a thick tape utilized in the present invention;

DETAILED DESCRIPTION OF THE INVENTION

Figure 4:
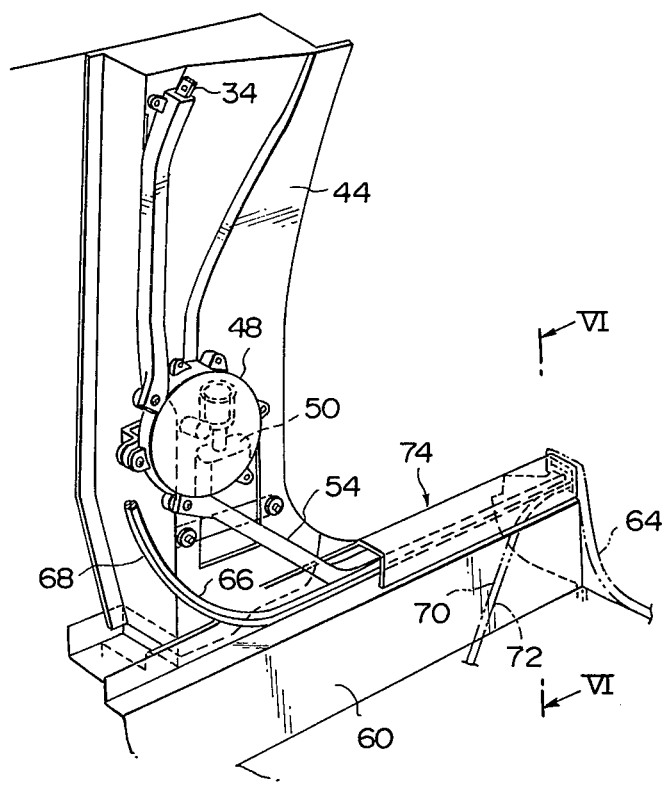
FIG. 4 is a partial close-up view illustrating the lower end of the front pillar.

Referring to FIG. 1, shown therein is a seatbelt system in accordance with the teachings of the present invention. In FIG. 1, the seatbelt system includes a passenger restraining belt 10 which is brought diagonally into contact with the passenger 14 seated on a passenger seat 12 to thereby bring the passenger into a fastened in condition. The inner end 16 of the belt 10 is wound up by a retractor 20 which is fastened to the floor 18 of the vehicle. This retractor 20 retracts the inner end 16 of the belt 10 by its own power and is fitted with an inertial locking mechanism which can instantly stop the unwinding of the belt 10 in times of a vehicular emergency.

The outer end 22 of the belt 10, as shown in FIG. 2, is fastened to a runner piece 24. Wheels 26 are provided on the runner piece 24 and the automatic fastening and unfastening operation of the belt 10 is accomplished by the forward and backward motion of the runner piece 24 in a guide rail 28 which is fastened to a roof side panel 27. As is shown in FIG. 2, slide rail 30 is fastened to guide rail 28 and thick tape 34, as shown in FIG. 3, is provided in a slide groove 32 of the slide rail 30. The thick tape 34 is made from synthetic resin and since it is inserted into slide groove 32 with only minimal clearance, it is extensible and compressible, i.e. it may transmit either extensive or compressive forces longitudinally. Also, a plurality of openings 36 are formed at appropriate intervals along the length of the tape 34. A slide block 38 is fastened to one end and engages with the runner piece 24 so that the motive force of the thick tape 34 is transmitted to the runner piece 24.

As is shown in FIG. 1, a front end of a thin belt 40 is fastened to runner piece 24 and the back end of the thin belt 40 is wound onto retractor 42, fastened to roof side panel 27 at the rear end of guide rail 28. In the same manner as retractor 20, which winds up the inner end 16, the retractor 42 contains inertial lock mechanism which can instantly stop the unwinding of the belt 10 in times of the vehicular emergency.

As is shown in FIG. 1, the slide rail 30 extends towards the front of the vehicle further than the guide rail 28 and descends along the front pillar 44 of the vehicle. As is shown in detail in FIGS. 4 and 5, the slide rail is connected to a sprocket housing 48 which is fastened to the lower end of front pillar 44 and contains sprocket wheel 46. Furthermore, thick tape 34, which moves in the slide rail 30, engages sprocket wheel 46 within sprocket housing 48 by means of the openings 36.

Sprocket wheel 46 is caused to move by a reversible motor 50 mounted within the front pillar 44 and the output of motor 50 passes through the sprocket housing lid 52 to transmit motive power to the sprocket wheel 46 within.

Figure 5:
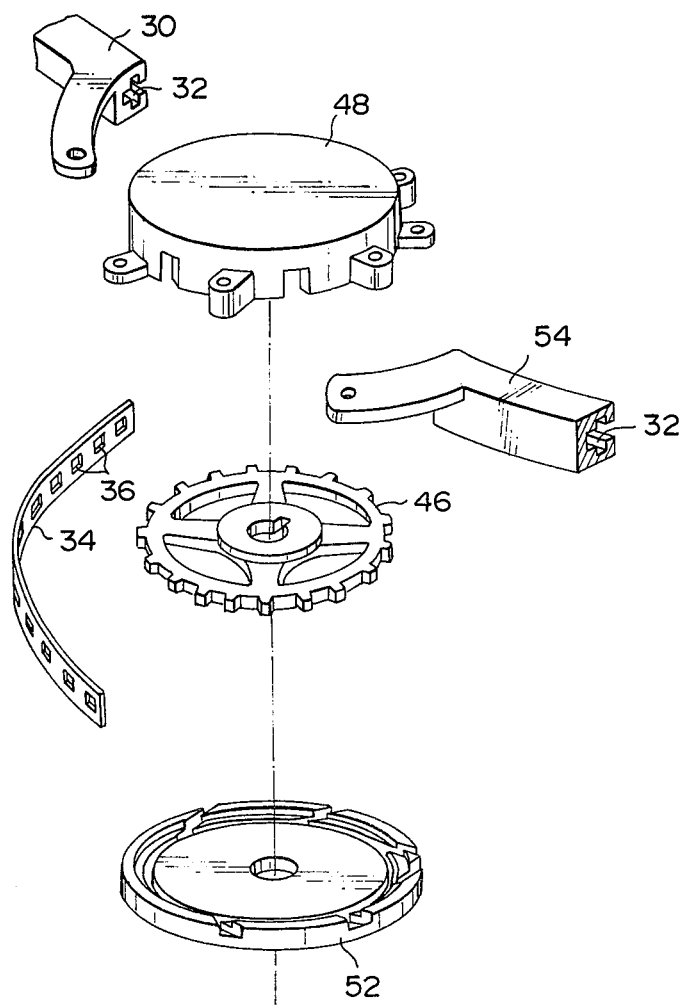
FIG. 5 is an exploded close-up view illustrating the sprocket wheel and the sprocket housing.
Figure 6:
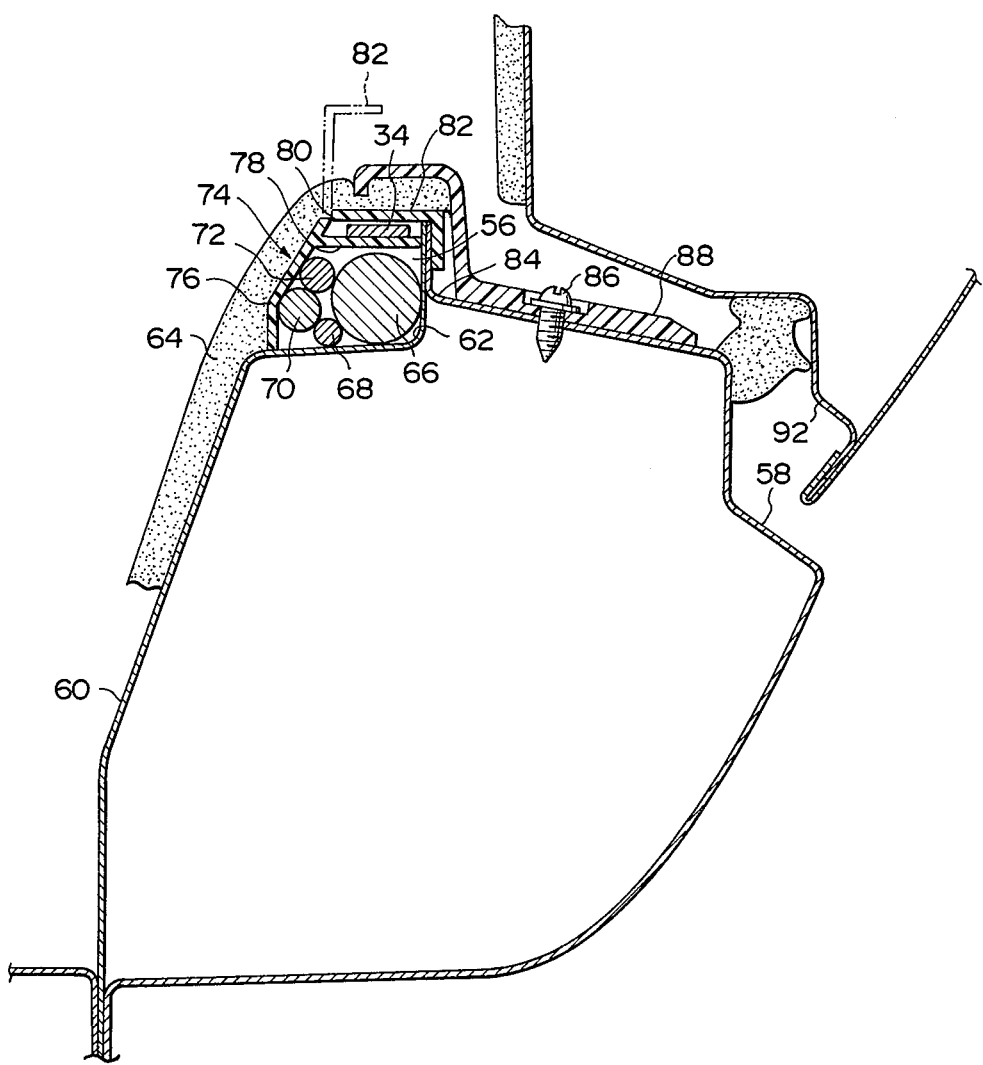
FIG. 6 is a cross sectional view along the line VI—VI in FIG. 4.

Motor 50 is arranged to operate by detecting the entrance or exit of a passenger. For example, if the door is opened to allow the passenger to board or alight, the sprocket wheel 46 turns in a counterclockwise direction in FIG. 1; however, if the door is closed after the passenger is seated, it turns in a clockwise direction. In each of the above described instances, the motor revolves a fixed number of revolutions to cause the runner piece 24 to move forward or backward in the vehicle via the thick tape 34. As is shown in FIG. 4, one end of a second slide rail 54 is fastened to the sprocket housing 48. As is shown in FIG. 6, the other end of the second slide rail 54 is coupled to wire harness receiver 56. The wire harness receiver 56 is a space formed by a rectangular groove 62 formed by the top of rocker inner panel 60 which togethe with the rocker outer panel 58 forms a rocker panel assembly. Carpet 64 is the interior lining cover for the rocker inner panel 60. Wire harness 66, which supplies electricity to the tail lights, etc., power window wire harness 68, trunk opener cable 70 and fuel tank cap opener 72, etc. pass through the wire harness receiver 56.

Also, protector 74 is fastened over the wire harness receiver 56 before it is covered with carpet 64. The protector 74 is made up of a vertical piece 76 which separates carpet 64 from the sides of the wire harness, a horizontal divider piece 78 integral with the vertical piece 76 and a hook shaped lid 82 which is connected via one-piece hinge 80 of thin material to the top side of the vertical piece 76. It is desirable that these pieces be formed from one piece and fron synthetic resin. Furthermore, the hook shaped plate 82 is fastened from above the vertical weld shaped region 84 which is formed when the tops of the rocker outer panel 58 and the rocker inner panel 60 are welded together and as shown in the double-dotted interrupted line in FIG. 6, before assembly this may be bent perpendicular to divider piece 78 so that the thick tape 34 may be mounted on top of the divider piece 78.

When the hook-shaped lid 82 is fastened to the vertical joint 84, hook-shaped lid 82 and the vertical piece 76 form the boundary between the wire harness receiver 56 and the carpet 64 and wire harness receiver 56 is divided horizontally by the divider piece 78. The wire harnesses are inserted into the lower compartment and the thick tape 34 into the upper compartment. Here, it is best that the upper compartment be made with a cross-section greater than that of the thick tape 34 so that the thick tape 34 may freely slide longitudinally, i.e. towards the front or rear of the vehicle.

As shown in FIG. 6, one side of carpet 64 is pressed onto the top of hook-shaped lid 82 by scuff-plate 88 which is fastened to the outer rocker panel 58 by screws 86. In this way, by fastening a protector over the wire harness receiver 56 thick tape 34 may be securely and easily attached to the wire harness receiver. An interior roof lining 90 as shown in FIG. 2 and door panel 92 as shown in FIG. 6 are also provided.

For the purposes of description of the operation of the first embodiment, the position indicated by the solid lines in FIG. 1 shows the condition where the passenger 14 is seated in seat 12 and the belt 10 has been automatically fastened and under normal operating conditions, by belt 10 unwinding from the retractor 20 the passenger can easily change his driving position. Also, in emergency conditions such as a vehicular collision, retractors 20 and 42 instantly stop the unwinding of the inner end 16 and narrow belt 40 and the passenger is maintained in a securely restrained position by the belt 10 and his safety is guaranteed. Now, when the passenger exits and opens the door, motor 50 turns in a counterclockwise direction in FIG. 1 and causes sprocket wheel 46 to turn. The turning of sprocket wheel 46 causes thick tape 34 to move which in turn causes the outer end 22 of the belt 10 to move in the direction indicated by the arrow A via runner piece 24, i.e. as shown in the double-dotted interrupted line. Therefore, belt 10 is moved towards the front of the vehicle and separates from the passenger seat 12 to provide a passenger sufficient space to exit. One end of thick tape 34 is extruded from sprocket housing 48 into the second slide rail 54 by the rotation of the sprocket wheel. As is shown in FIG. 6, the extruded thick tape 34 moves to the rear of the vehicle through wire harness receiver 56 on top of divider piece 78. Since the thick tape 34 in wire harness receiver 56 is separated from the outside by divider piece 78 and hook-shaped lid 82, the passenger does not come into contact with the thick tape. Furthermore, since dust cannot enter the wire harness receiver 56, smooth operation of the thick tape 34 is quaranteed. Also, since thick tape 34 is protected by divider piece 78 and hook-shaped lid 82, even when wire harness receiver 56 is stepped on by a passenger, the movement of thick tape 34 is not affected.

When a passenger reenters and closes the door after sitting down, motor 50 reverses and thick tape 34 moves the outer end 22 towards the rear of the vehicle via sliding block 38 and runner piece 24. As a result, the belt 10 automatically fastens itself about the passenger as shown by the solid lines of FIG. 1. In this case, the thick tape 34 which is extruded into the wire harness receiver 56 from the sprocket housing 48 once more reverses and is extruded into slide rail 30 and passes through sprocket housing 48. As a result of the above described construction, the motion of the thick tape 34 is smooth.

Figure 7:
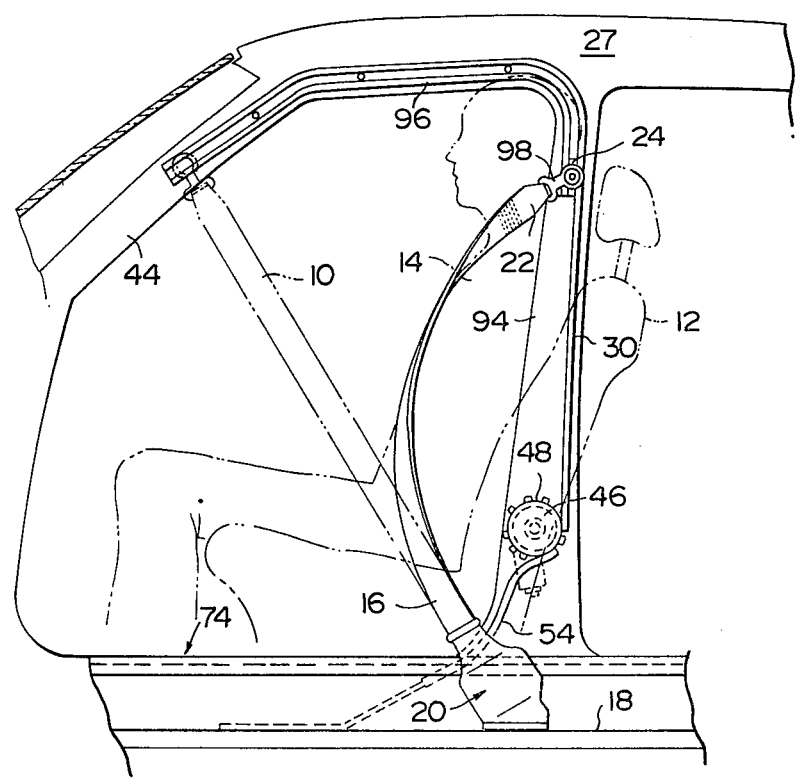
FIG. 7 is a side view analogous to FIG. 1 which shows a second embodiment of the present invention.
Figure 8:
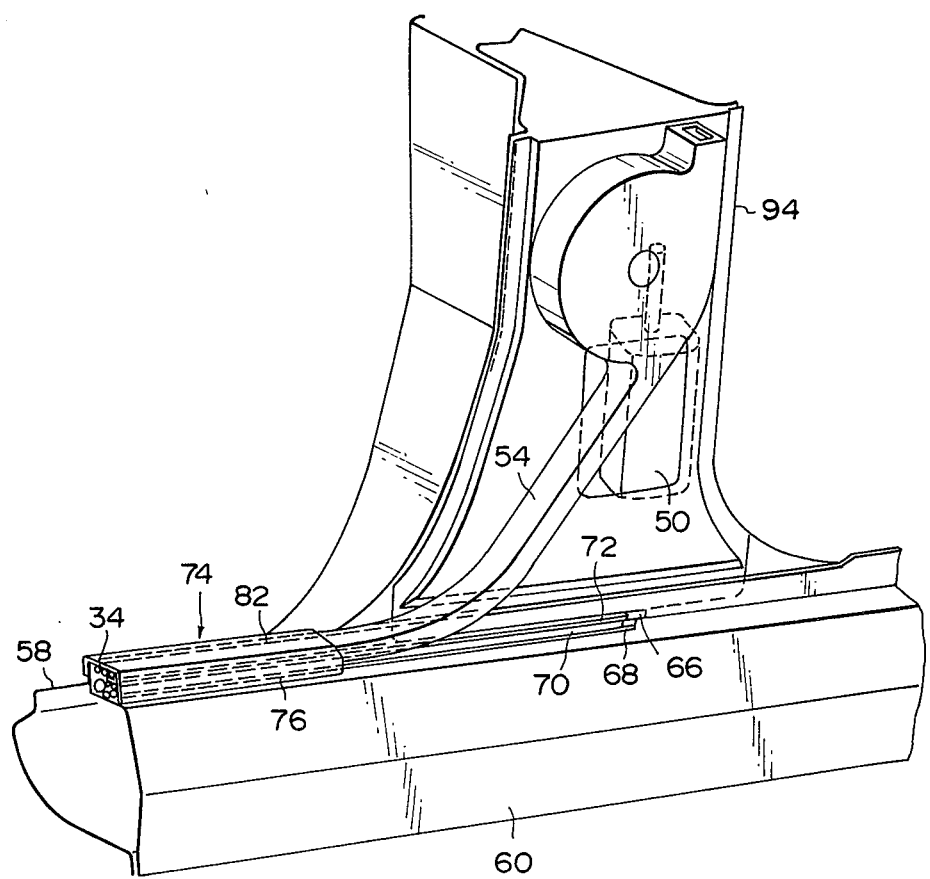
FIG. 8 is an interior close-up view illustrating the central pillar region.

Referring to FIGS. 7 and 8, shown therein is a second embodiment of the present invention. In this second embodiment the sprocket housing is fastened to the lower part of the center pillar 94. In addition, the center part of guide rail 96 runs horizontally along the roof side panel 27 but the front part descends towards the front of the car along the front pillar 44 and the rear end descends turning through a right angle down center pillar 94. Furthermore, in this second embodiment there is no retractor for moving runner piece 24 towards the rear of the vehicle or for stopping the motion of the runner piece 24 in a vehiclular emergency. The vertical part of guide rail 96 which runs down the center pillar 94 prevents the forward motion of the outer end 22 in a vehicular emergency. Furthermore, in this embodiment an anchor plate 98 is rotatably fastened to the runner piece 24 between the outer end 22 and runner piece 24. A slide rail 30, similar to that of the previously described embodiment, descends from the vertical part of guide rail 96 and is connected to the sprocket wheel 46 and a second slide rail 54, similar to that of the previous embodiment, descends from the sprocket wheel 46 and is connected to the wire harness receiver 56 such that, as in the previous embodiment, the thick tape extruded from the sprocket housing 48 can be received therein.

The remaining elements of the second embodiment are similar to that described above and a description of the operation and their interconnection of operation will be omitted. Furthermore, it should be apparent that this second embodiment operates and gives similar results to those obtained in the first embodiment.

As described above, in the seatbelt system of the present invention, since the remaining part of the thick tape passes into a wire harness receiver formed from the upper part of the inner rocker panel of the vehicle, the remaining portion of the thick tape 34 is appropriately disposed inside the body panel. Therefore, assembly is simplified and exposure of thick tape to the interior of the vehicle does not occur and deterioration and damage to the thick tape does not occur. Furthermore, since smooth motion of the thick tape is maintained by present invention, the reliability of the seatbelt system of the present invention is improved and excellent results are obtained.

It should be apparent to those skilled in the art that the above described embodiments are merely illustrative of but a few of the many possible specific embodiments which represent the application of the principles of the present invention. Numerous and varied other arrangements can be readily devised by those skilled in the art without departing from the spirit and scope of the invention.

We claim:

1. A seatbelt system which can automatically fasten and unfasten a belt about a passenger comprising:
   a flexible tape provided with a plurality of openings along its length which is coupled to one end of said passenger restraining belt;
   a toothed sprocket wheel provided for engaging with said plurality of openings in said flexible tape;
   a driving means for driving said sprocket wheel and for causing said belt to approach or recede from a passenger via said flexible tape;
   a receiver region formed in a space defined by an upper portion of an inner rocker panel and an inner surface of a joint of welding between the inner rocker panel and an outer rocker panel; and
   a divider provided in the receiver region for dividing the receiver region into a compartment for inserting wire harnesses and a compartment for inserting said flexible tape.

2. A seatbelt system according to claim 1, wherein said sprocket wheel is mounted in a lower part of a vehicle.

3. A seatbelt system according to claim 1, wherein said sprocket wheel is mounted in a lower part of said vehicle's center pillar.

4. A seatbelt system according to claim 1, wherein said receiver region is separated from an interior lining by a protector.

5. A seatbelt system according to claim 4, wherein said protector comprises a vertical piece and a lid piece fastened to a top side of said vertical piece.

6. A seatbelt system according to claim 5, wherein the outer edge of said lid piece is curved into a hook shape and is coupled to said rocker inner panel.

7. A seatbelt system according to claim 6, wherein said hook shape piece is fastened to said vertical joint where said rocker inner panel and rocker outer panel are welded together.

8. A seatbelt system according to claim 5, wherein said vertical piece and lid piece are rotatably coupled together into one piece by a thin hinge.

9. A seatbelt system according to claim 8, wherein said compartment for the insertion of flexible tape is rectangular shaped in cross-section.

10. A seatbelt system according to claim 5, wherein said receiver region is divided by the divider coupled to a central part of said vertical piece.

11. A seatbelt system according to claim 10, wherein said sprocket wheel is provided in a sprocket wheel case and said compartment for insertion of said flexible tape is coupled to said sprocket wheel case via a slide rail for guiding said flexible tape.

12. A seatbelt system which can automatically fasten and unfasten a belt about a passenger comprising:
   a flexible tape provided with a plurality of openings along its length which is coupled to one end of said passenger restraining belt;
   a toothed sprocket wheel provided for engaging with said plurality of openings in said flexible tape;
   a driving means for driving said sprocket wheel and for causing said belt to approach or recede from a passenger via said flexible tape; and
   a protector provided on a rocker panel of the vehicle comprising a vertical piece, a lid piece fastened to the top side of said vertical piece and a divider fastened to a central part of said vertical piece forming a compartment for inserting a wire harness and a compartment for inserting said flexible tape.

* * * * *